UNITED STATES PATENT OFFICE.

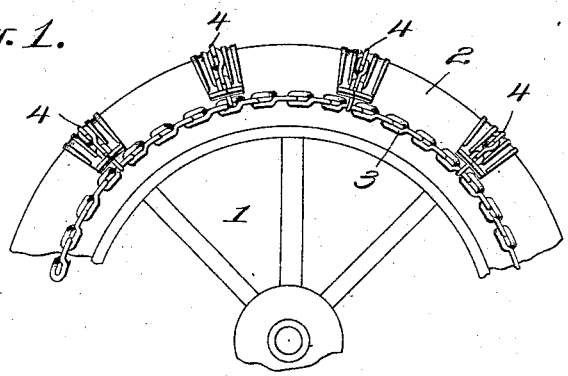
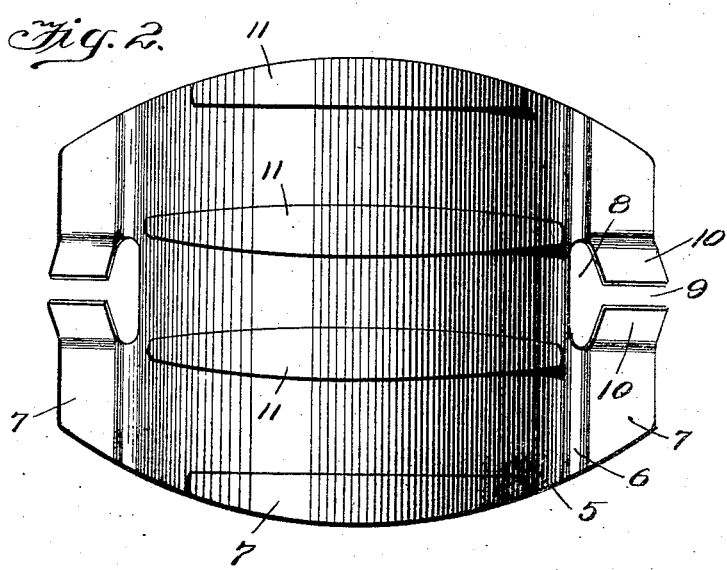
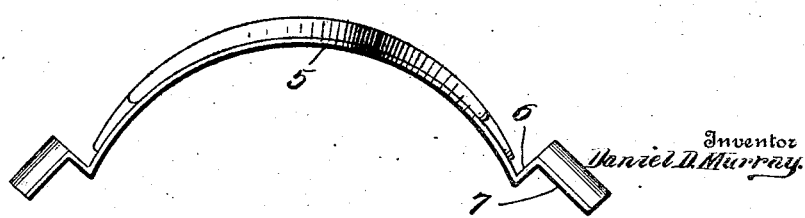

DANIEL D. MURRAY, OF DULUTH, MINNESOTA, ASSIGNOR OF ONE-EIGHTH TO NEIL S. STALKER, OF DULUTH, MINNESOTA.

TIRE-PROTECTOR.

968,184.  Specification of Letters Patent.  Patented Aug. 23, 1910.

Application filed April 9, 1909. Serial No. 488,868.

*To all whom it may concern:*

Be it known that I, DANIEL D. MURRAY, a citizen of the United States, residing at Duluth, in the county of St. Louis and State of Minnesota, have invented new and useful Improvements in Tire-Protectors, of which the following is a specification.

This invention relates to tire protectors, the object of the invention being to provide a simple and effective protector shield for preventing anti-skidding chains from injuring rubber tires, the protector or shield being adapted to be readily applied to the ordinary anti-skidding chain without the use of screws, bolts or other analogous fastening devices.

With the above general object in view the invention consists in the novel construction, combination and arrangement of parts herein fully described, illustrated and claimed.

In the accompanying drawings:—Figure 1 is a side elevation of a portion of a wheel, showing a tire chain applied to the tire thereof, and several of the protectors or shields connected with portions of the chain. Fig. 2 is a plan view on an enlarged scale of one of the protectors. Fig. 3 is an edge view of the same.

Referring to the drawing 1 designates a wheel, 2 a rubber tire, 3 one of the circular sections of an anti-skidding chain and 4 the transverse sections or portions of the chain, which portions embrace the outer or tread portion of the tire as shown in Fig. 1.

In connection with each transverse section 4 of the chain, I employ a shield or protector shown in detail in Figs. 2 and 3, the same comprising a concavo-convex or arched body 5 formed preferably of sheet metal of the proper gage, the opposite end portions of the body being offset as shown at 6 and then extended about tangentially to the arch of the body to form flanges 7. About centrally of the length of the offset portion 6 at each side of the shield or protector, a chain slot or aperture 8 is formed and the flange 7 is centrally divided as shown at 9, forming oppositely arranged slot closing lips or lugs 10 between which the transverse portions 4 of the chain are adapted to be inserted in the slots or apertures 8, after which they are retained in place by bending the lugs or lips 10 back into the same common plane with the flanges 7. This has the effect of closing the entrance to the slots 8 and prevents disconnection between the protector and the chain.

In the preferred embodiment of the invention, a plurality of ribs 11 are provided on the outer surface of the protector as best indicated in Fig. 2, said ribs extending in substantially parallel planes and transversely of the tire and serving to obtain a grip on the surface over which the wheel is being propelled. The inner ribs 11 are preferably arranged at a suitable distance apart to allow the section 4 of the chain to lie between them, thus removing a good portion of strain from the retainer lips or lugs 10. The shield or protector herein above described is interposed between the chain and the tire and forms an effective protector for the tire by preventing the chain from scraping and cutting into the tread portion of the tire. After the protectors are connected to the chain in the manner shown and described, they remain fastened to the chain in readiness for use at any time.

I claim:

1. The combination with a tire chain embodying circumferential side members and transverse sections connecting the side members, of a tire protector consisting of an arched metallic body adapted to be interposed between a transverse section of the chain and the tire, and means on said protector for attaching the same to said transverse section only of the chain.

2. A tire protector for preventing anti-skidding chains from injuring rubber tires, consisting of an arched metal body adapted to be interposed between a transverse section of the chain and the tire, means for securing the protector to such portion of the chain, and chain-retaining ribs projecting from the outer face of said protector and extending transversely of the tire.

3. A tire protector for preventing anti-skidding chains from injuring rubber tires, consisting of an arched metal body adapted to be interposed between a transverse section of the chain and the tire, and flanges at opposite sides of the protector provided with open slots to admit of the lateral insertion and removal of the transverse chain section, said slots being adapted to be closed for the purpose specified.

4. A tire protector for preventing anti-skidding chains from injuring rubber tires, consisting of an arched sheet metal body adapted to be interposed between a transverse section of the chain and the tire, and flanges having chain slots and divided in line with the slots to form bendable lugs adapted to open and close the slots.

In testimony whereof I affix my signature in presence of two witnesses.

DANIEL D. MURRAY.

Witnesses:
  A. E. ZIMMERMAN,
  LULU DALCOUR.